United States Patent [19]

Strong

[11] Patent Number: 4,499,818
[45] Date of Patent: Feb. 19, 1985

[54] METHOD AND APPARATUS FOR HOLDING FRESHLY PREPARED FRIED FOOD PRODUCTS

[75] Inventor: William K. Strong, Solvang, Calif.

[73] Assignee: Restaurant Technology, Inc., Oak Brook, Ill.

[21] Appl. No.: 431,812

[22] Filed: Sep. 30, 1982

[51] Int. Cl.³ ............................................. A47J 36/24
[52] U.S. Cl. ........................................ 99/483; 34/231; 99/516; 219/214; 219/386; 219/400; 219/408
[58] Field of Search ................ 99/448, 450, 451, 339, 99/403, 483, 516; 34/231, 233, 225; D7/363; 312/236; 219/400, 408, 401, 369–371, 214, 218, 220, 386; 126/276, 6, 2, 248

[56] References Cited

U.S. PATENT DOCUMENTS

| | | | |
|---|---|---|---|
| 2,790,250 | 4/1957 | Giroud | 34/231 |
| 3,073,039 | 1/1963 | Williams | 34/231 |
| 3,120,599 | 2/1964 | Hilgers | 219/214 X |
| 3,584,846 | 6/1971 | McCoy | 34/231 X |
| 4,065,251 | 12/1977 | Croft et al. | 34/233 |
| 4,110,916 | 9/1978 | Bemrose | 99/483 X |
| 4,126,775 | 11/1978 | Wyatt | 312/236 X |
| 4,192,081 | 3/1980 | Erickson et al. | 99/483 X |
| 4,206,554 | 6/1980 | Fowler | 34/233 |

Primary Examiner—Timothy F. Simone
Attorney, Agent, or Firm—Dressler, Goldsmith, Shore, Sutker & Milnamow, Ltd.

[57] ABSTRACT

An apparatus and method are disclosed for maintaining the crispness and sensory appeal of fried food products after they are fried, but before they are served. The invention contemplates that freshly fried food products are positioned in a product holding area which is at least partially defined by a foraminous surface, such as a perforated plate, upon which the food products are placed. The food products are subjected to forced hot air circulation provided by a suitable blower and heating arrangement so that hot air circulates about the food products to evaporate moisture from their surfaces which migrates from their moist interiors, this moisture migration otherwise tending to render the food products undesirably uncrispy or soggy within a relatively short time. The present invention is particularly suited for use in the food service industry since a consistently high quality product can be served, with desired flexibility provided in the preparation of the product.

15 Claims, 10 Drawing Figures

4,499,818

METHOD AND APPARATUS FOR HOLDING FRESHLY PREPARED FRIED FOOD PRODUCTS

TECHNICAL FIELD

The present invention relates generally to apparatus for preparation of food products for restaurant service, and more particularly to an apparatus and method for maintaining the crispness of fried food products prior to their consumption.

BACKGROUND OF THE INVENTION

A large part of the appeal of food products which are deep-fried or likewise prepared comes from the characteristic crispness of the exterior of the products, while the interior of the products is typically hot and moist. These characteristics are particularly appealing in such foods as French fried potatoes, hash brown potatoes, batter-fried chicken nuggets, and other similar fried foods. When properly prepared, these types of food have an appealingly crisp surface texture, while the interior of the products is moist and tender.

In the food service industry, preparation and service of fried food products having the desired sensory characteristics can be difficult. Although deep-frying and like cooking techniques can be suitably refined to provide fried products having the desired characteristics upon completion of cooking, problems are generally encountered in maintaining the desired surface crispness of the products between the time they are cooked and the time they are served. It is generally recognized that the crispness of fried foods is adversely affected within a relatively short time after they are cooked because moisture from within the interior of the products migrates to their surfaces. Consequently, the surfaces of the products lose their desired cripness, this condition being readily detectable when the products are consumed since they tend to feel soggy and/or greasy, and may taste of the frying medium.

In the fast service restaurant industry, a premium is placed upon quick and efficient service of food, and this essentially precludes individual cooking of each food order. In view of this, concerted efforts have been made to perfect arrangements for holding fried food products after they are cooked, but before they are served, to preserve their desired crispness and sensory appeal.

In the past, the most commonly employed methods for attempting to maintain the desired characteristics of freshly fried food products has been to position infrared emitting heat lamps in close proximity to the products or to place products in heated holding cabinets, such as those having doors or drawers. Enclosed cabinets make the product relatively less accessible. The infra-red devices produce infra red radiation emitted from incandescent or quartz lamps which radiation strikes the food products in the associated holding area to aid in the retention of heat in the products. While these methods for holding fried food prior to service are very widely used, experience has shown that freshly fried food products can only be maintained for a limited period of time before the sensory appeal and characteristic crispness deteriorate significantly. This primarily results from the migration of moisture from the interior of the products to the exterior, with a heat source such as the infra-red radiation striking the products only tending to keep the products warm, but not crisp. As a consequence, the preparation of fried food products must be very carefully coordinated with customer demand at any given time. In the event that fried foods are not sold within a relatively short time after they are cooked, they can only be served at the risk of great customer dissatisfaction, and therefore should be discarded.

In view of the desirability of maintaining the sensory quality of fried food products for as long as possible after they are fried, the introduction of a method and apparatus for maintaining the crispness of fried food products represents a significant development, particularly for the fast service restaurant industry, in view of the enhanced product quality and flexibility in product preparation attainable.

SUMMARY OF THE INVENTION

The present invention pertains to a method and apparatus for maintaining the crispness of fried food products after frying by the forced circulation of heated air about the products prior to service. In this manner, moisture which migrates to the crisp exteriors of the food products is evaporated by the moving heated air flow, significantly enhancing the sensory appeal and quality of the food products, and maintaining these desired characteristics for longer periods of time than have been heretofore attainable.

The present invention contemplates that after frying, fried food products are placed in a product holding area which is at least partially defined by a generally upwardly facing foraminous surface, such as a perforated plate. Heated air is circulated through the foraminous surface and about the freshly fried food products to maintain the crispness of the food products prior to consumption. Specific temperature ranges and air flow velocities are disclosed herein which have been found to be particularly effective in obtaining the desired results, but it will be understood that the invention can be practiced in accordance with the teachings herein with air flow temperatures and velocities other than those exemplary ones referred to.

The apparatus for practicing the present method comprises a generally closed housing having a generally upwardly facing foraminous surface which provides the product holding area for receiving food products. An air circulating blower is associated with the housing for circulating air through the housing and foraminous surface and about the food products in the holding area. A suitable heater arrangement is provided in association with the circulating blower for heating the circulating air, in this way providing relatively hot, dry air for circulation about the products.

In the presently preferred embodiment of the invention, the apparatus housing includes another foraminous surface close to, but spaced from, the product holding area. This second foraminous surface provides another or secondary product holding area, which is particularly suited for keeping the food products warm and palatable after they are packaged. In this embodiment, an air intake for the circulating blower is provided in close association with the first or primary product holding area so that at least some of the heated air circulated about the food products therein is recycled or recirculated through the blower, thus enhancing energy efficiency.

In an alternate embodiment of the present apparatus, adjustable internal baffles are provided within the housing and are positioned in association with the foraminous surface providing the product holding area at the upper portion of the housing. The baffles are adapted to divert a portion of the heated air flow within the housing for circulation about the food products without passage through the foraminous surface by guiding the air flow about the foraminous surface and against the food products positioned thereon.

Further objects, advantages and features of the present invention will become more readily apparent from the following detailed description of the invention and embodiments thereof, from the claims and from the accompanying drawings.

DETAILED DESCRIPTION

Figure 1:
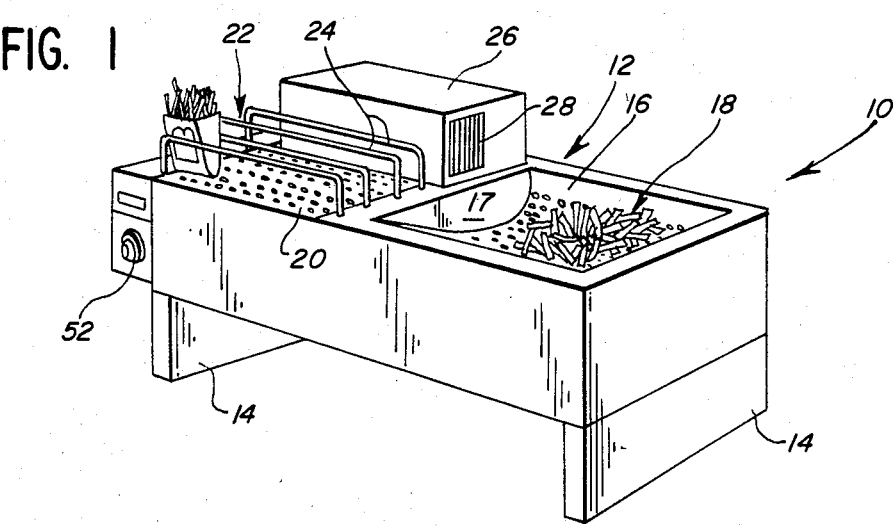
FIG. 1 is a front perspective view of the apparatus in accordance with the present invention for holding fried food products.

While the present invention is susceptible of embodiment in various forms, there are shown in the drawings and will hereinafter be described a presently preferred embodiment and an alternate embodiment, with the understanding that the present disclosure is intended as an exemplification of the principles of the invention, and is not intended to limit the invention to the embodiments disclosed herein.

With reference now to FIGS. 1-6, therein is illustrated the presently preferred embodiment of the fried food holding apparatus 10 in accordance with the present invention. Holder 10 is particularly suited for practicing the present method, which can be utilized for preserving the crispness of all manner of fried foods, such as French fried or hash brown potatoes, fried chicken or fish, and similar food products.

In this embodiment of the invention, fried food holder 10 includes a box-like, generally closed housing 12, which can be suitably fabricated from stainless steel or like materials for an attractive durable, low-maintenance and sanitary finish. The housing 12 is generally closed in the sense that the passage of air into and from the housing is limited to selected sections thereof, with air flow within the housing appropriately guided by internal baffles or ductwork, as will be described. As illustrated, the housing 12 is supported upon legs 14 so that the top of the housing is generally positioned at a comfortable working level for restaurant personnel.

As discussed, the present invention contemplates preservation of the crispness of fried foods by the circulation of heated air about the food. To this end, housing 12 includes a generally upwardly facing foraminous surface provided by a plate 16 which is at least partially perforated. Perforated plate 16 is suitably shaped and connected with a pair of spaced side walls 17 so that they together define an upwardly opening, bin-like product holding area, generally designated 18. Product holding area 18 is adapted to receive food products after they are fried, such as the French fried potatoes illustrated in FIG. 1. The bin-like configuration of product holding area 18 facilitates the packaging of the food products therein, such as by scooping, gripping with tongs, etc. In the illustrated embodiment, the portion of plate 16 which is perforated is such that it extends generally along the bottom of the holding area 18, this preferred configuration positioning the perforations generally beneath food products placed in the holding area. As will be appreciated, the exact configuration of perforated plate 16 and holding area 18 can be varied in accordance with the teachings herein.

In this embodiment of the present apparatus, housing 12 preferably includes another or second generally upwardly facing foraminous surface, which in the illustrated embodiment is provided by a perforated portion of plate 20 of housing 12. The present invention contemplates that heated air is circulated through the perforations in plate 20 to thereby provide a packaged product holding area, designated 22, for keeping the fried food products warm after they are packaged. To this end, one or more suitable package supports 24 can be provided atop plate 20. In this manner, food products from product holding area 18 can be bagged or otherwise suitably packaged, and then placed in the packaged product holding area 22 when they are ready to be served. Convenient and efficient preparation, holding, and service of the fried food is facilitated in this manner.

Figure 2:
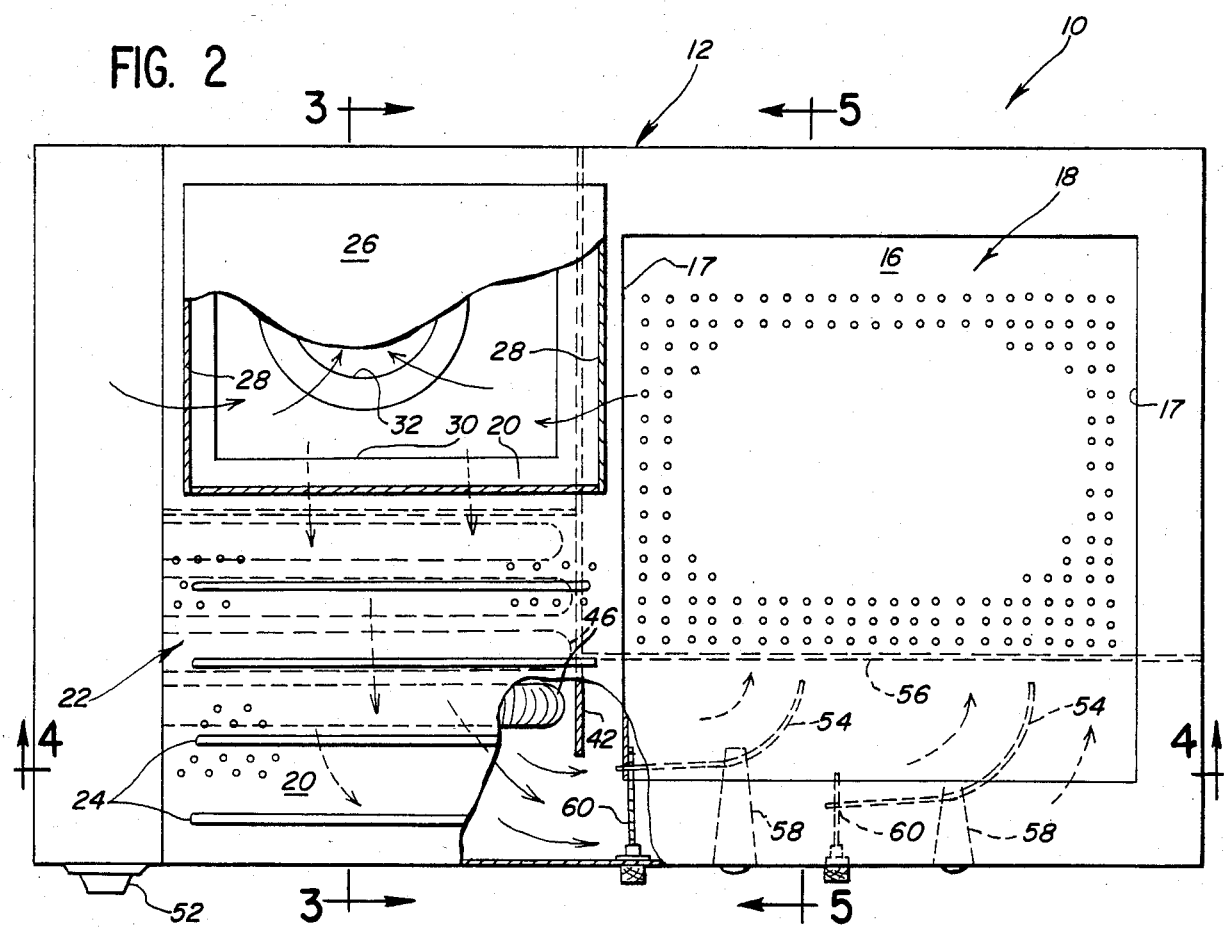
FIG. 2 is a top plan view in partial cutaway of the holding apparatus illustrated in FIG. 1.
Figure 5:
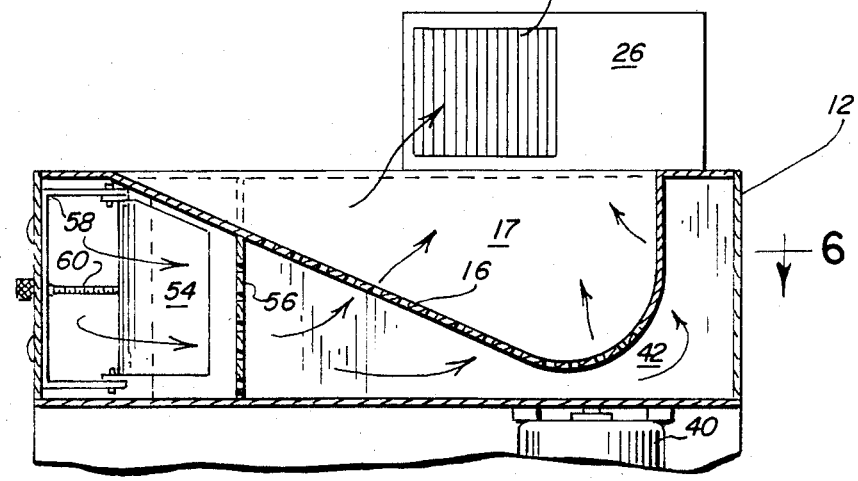
FIG. 5 is a partial cross-sectional view taken generally along lines 5—5 of FIG. 2.

In order to provide for circulation of air within housing 12 for subsequent discharge through perforated plates 16 and 20, the housing includes a box-like intake plenum 26. The intake plenum includes one or more intake louvers 28 through which air flows into the housing 12. The intake louvers 28 are preferably adjustable in nature thereby facilitating convenient adjustable damping of the air circulated within housing 12 for selectively varying the velocity of the air flow through perforated plates 16 and 20. As best illustrated in FIGS. 2 and 5, at least one of the intake louvers 28 is preferably positioned in close association with the product holding area 18. In this way, at least some of the heated air which passes through perforated plate 16 is drawn into the intake plenum 26, and thereby recirculated or recycled for enhancing energy efficiency.

Figure 3:
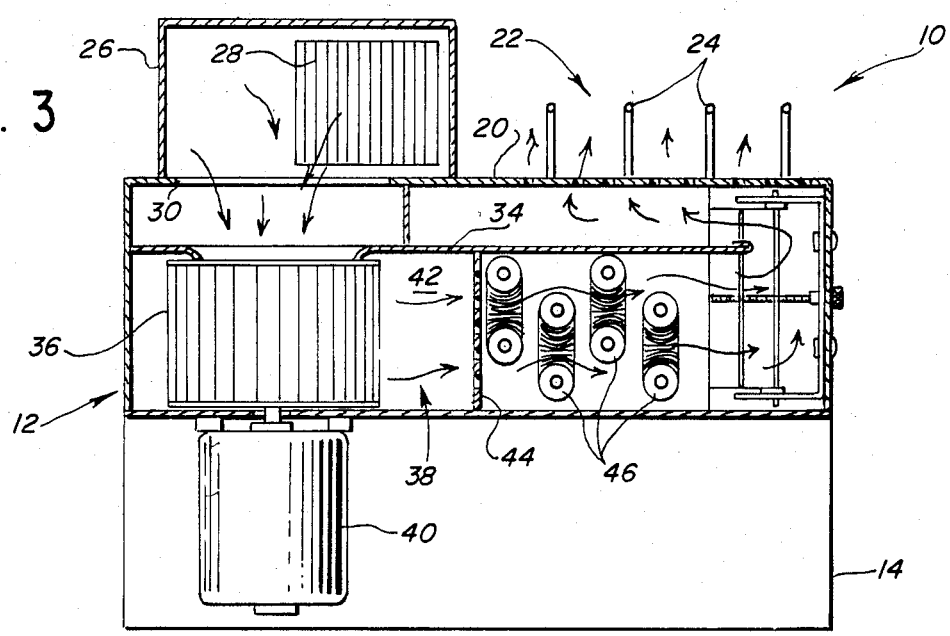
FIG. 3 is a cross-sectional view taken generally along lines 3—3 of FIG. 2.
Figure 4:
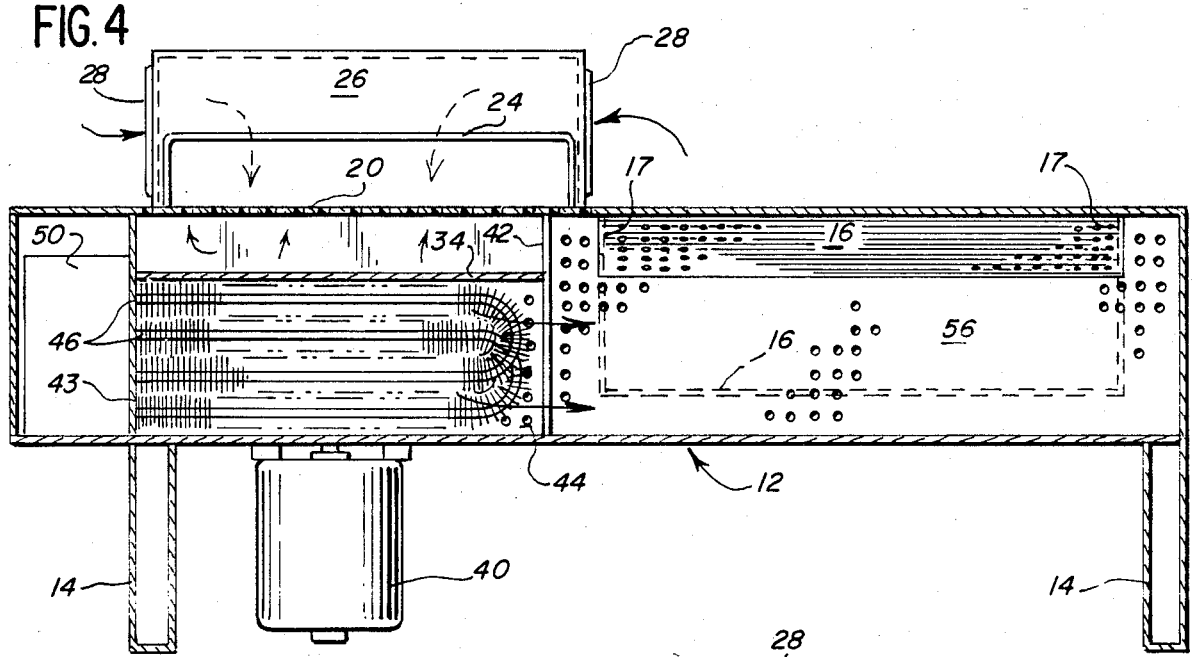
FIG. 4 is a cross-sectional view taken generally along lines 4—4 of FIG. 2.

As illustrated in FIG. 3, air drawn into intake plenum 26 through louvers 28 passes downwardly in housing 12 through an intake aperture 30 defined by the plate 20. The air then flows through another intake aperture 32 defined by a generally horizontally extending internal baffle 34. The air then is further circulated by suitable means, illustrated as a squirrel-cage type blower 36, disposed within a blower chamber 38 within the housing 12. In the illustrated embodiment, blower 36 is operated by a suitable electrically powered blower motor 40 which is supported by and extends beneath the housing 12. Blower chamber 38 is partially defined by the external walls of the housing 12, and is further defined by a vertically extending internal baffle 42, and a vertically extending internal wall 43. The blower chamber 38 is further defined by a perforated or otherwise foraminous internal baffle 44 through which circulated air from the blower 36 flows.

In order to heat the air which is circulating within the housing 12, air flow from the blower 36 circulates and passes about one or more heater elements 46 positioned downstream of perforated internal baffle 44. In the illustrated embodiment, a plurality of heater elements 46 are illustrated in a staggered array, with the heater elements extending through internal wall 43. The heater elements may comprise individual finned heating elements which are individually wired. Notably, the provision of perforated internal baffle 44 between blower 36 and heater elements 46 enhances the uniformity of the circulated air flow across the heater elements for efficiently increasing the temperature of the air. The heater arrangement is preferably thermostatically controlled, and provided with suitable external controls such as 52 for selectively adjusting the temperature of the heated air which is circulated about the food products in the product holding areas 18 and 22. In the presently preferred embodiment illustrated, heater elements 46 are electrically powered, although it will be appreciated that other types of heating arrangements could also be used.

Figure 6:
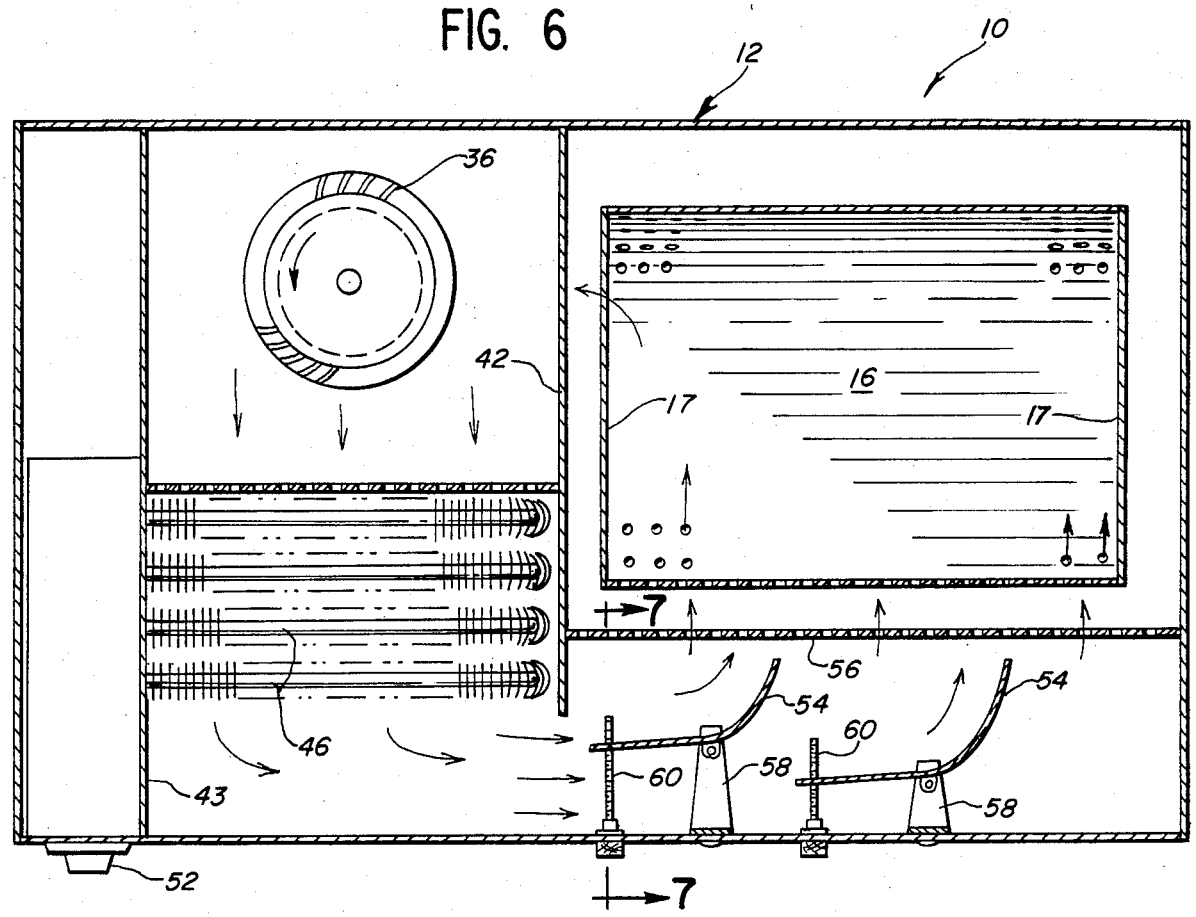
FIG. 6 is a cross-sectional view taken generally along lines 6—6 of FIG. 5.
Figure 7:
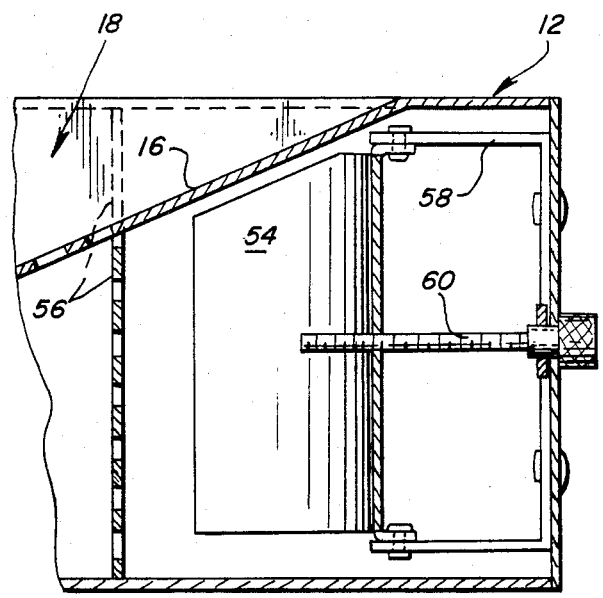
FIG. 7 is a partial cross-sectional view taken generally along lines 7—7 of FIG. 6.

After the circulating air is heated by the heater elements 46, the air is guided or ducted to the product holding areas 18 and 22. As best illustrated in FIG. 6, a significant portion of the circulating air flows past internal baffle 42 for passage through perforated plate 16 for circulation about the food products in the bin-like product holding area 18. In order to enhance the uniformity of air flow into the product holding area 18, one or more adjustable internal baffles or vanes, such as 54, can be provided downstream of heating elements 46 for adjustable guidance of the flow of air through a perforated internal baffle 56 preferably positioned immediately upstream of the product holding area 18 and downstream of the heater elements 46. Adjustable baffles 54 and internal baffle 56 enhance the uniformity of heated air flow into the area within housing 12 about product holding area 18, resulting in more uniform air flow across the face of the perforated plate 16. In the illustrated embodiment, a pair of adjustable baffles 54 are provided in staggered relation to each other, each being suitably pivotally supported by a baffle support 58 for adjustable movement attendant to rotation of threaded adjustment knobs 60 which extend through the front wall of housing 12. As discussed, heated circulating air passing through perforated plate 16 circulates about the fried food products in the product holding area 18, with some of the heated air subsequently drawn into intake louver 28 for recirculation through the apparatus.

In order to provide circulation of heated air about the products in the packaged product holding area 22, internal baffles 42 and 34 are arranged to divert a portion of the heated air flow across heater elements 46 for passage through the perforations in plate 20. In this way, a portion of the heated air flow from within housing 12 is directed upwardly through plate 20 for circulation about food products in holding area 22. Even though one of the objects of the present invention is to eliminate the deleterious effects of commonly used radiant heat lamps upon fried food products, it has been recognized that such heat lamps do keep food products warm. Thus, this preferred provision of a secondary product holding area 22 for packaged products desirably maintains the products appealingly hot for service to customers.

Figure 8:
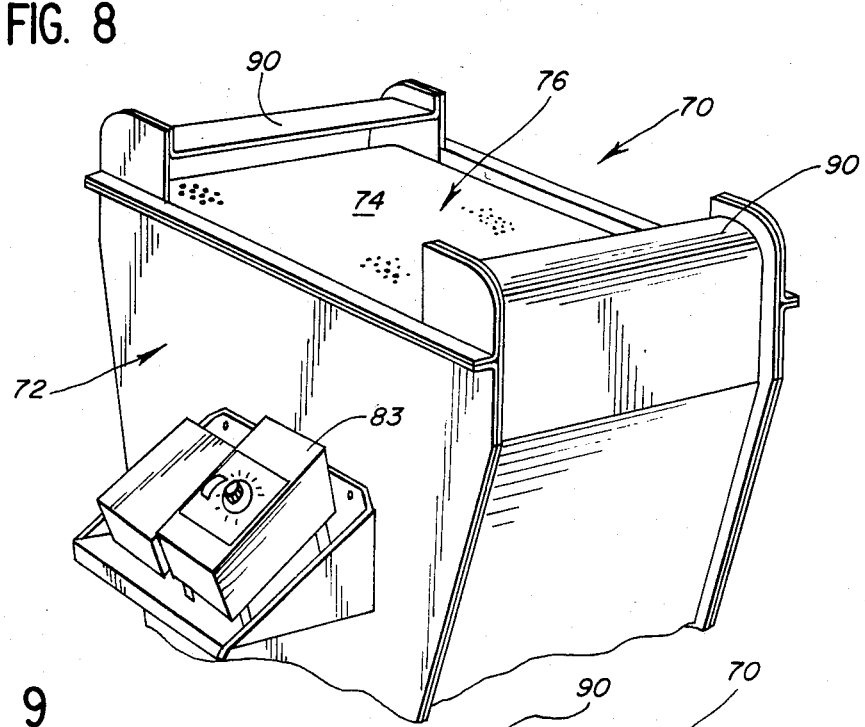
FIG. 8 is a partial perspective view illustrating an alternate embodiment of the present apparatus.
Figure 9:
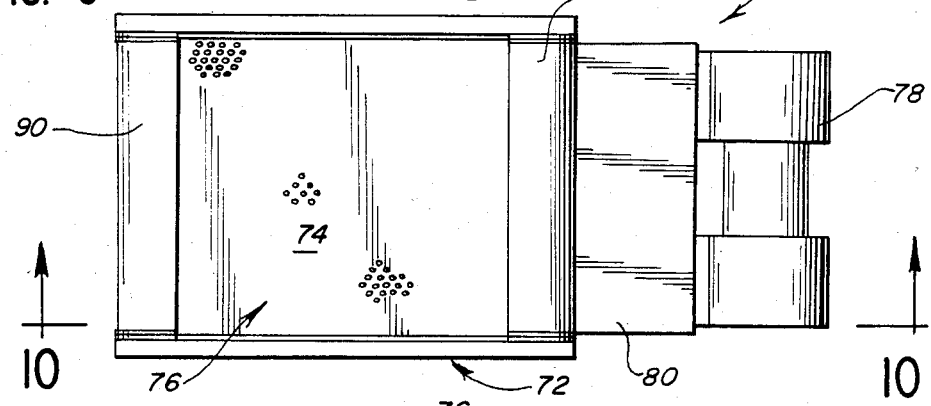
FIG. 9 is a top plan view of the apparatus illustrated in FIG. 8.
Figure 10:
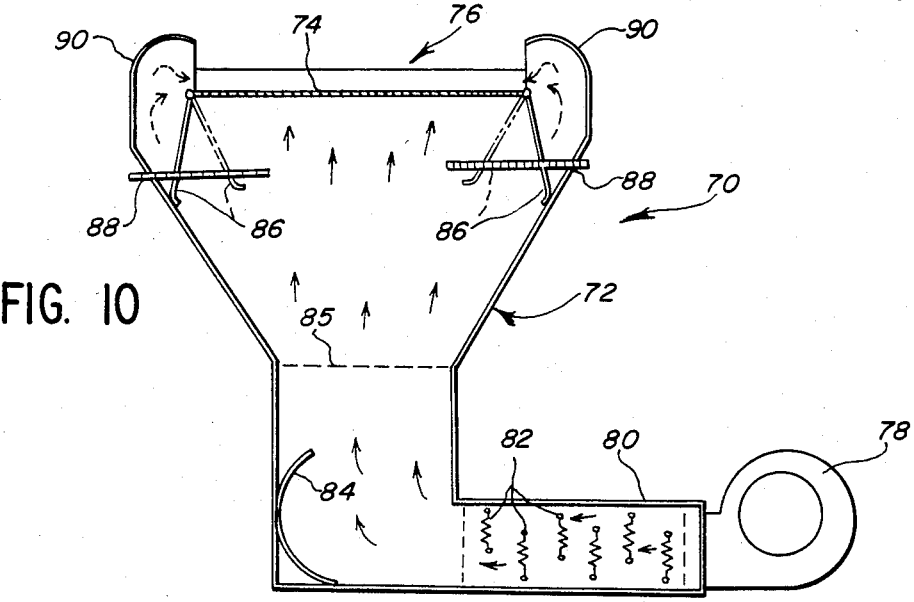
FIG. 10 is a cross-sectional view taken generally along lines 10—10 of FIG. 9.

With reference now to FIGS. 8–10, an alternate embodiment 70 of the present fried food holding apparatus is illustrated. In this embodiment, an upstanding, generally closed housing 72 is provided, and includes a generally upwardly facing perforated plate 74 at the upper portion of the housing for providing a foraminous surface beneath a product holding area 76. As in the above-described embodiment, housing 72 is preferably fabricated from suitably durable and low-maintenance materials, such as stainless steel.

In this embodiment, forced circulation of heated air within housing 72 is provided by a blower 78 connected to a lower portion 80 of housing 72. Blower 78 is preferably electrically powered, and draws ambient air through its intakes for circulation upwardly through housing 72 and through perforated plate 74.

In order to heat the circulated air, a plurality of heater elements 82 (illustrated schematically) are provided within the lower housing portion 80 in a preferably staggered array. Heater elements 82 are preferably electrically powered, and may be suitably thermostatically controlled or otherwise operated such as by heater controls 83. Thus, air circulated by blower 78 is heated by the heater elements 82 for subsequent circulation about food products positioned atop perforated plate 74 in the product holding area 76.

Circulating air from the heater elements 82 is guided upwardly within housing 72 by an internal baffle 84. A perforated or otherwise foraminous internal baffle 85 is preferably positioned downstream of the heater elements and upstream of perforated plate 74 for enhancing the uniformity of air flow through the plate 74.

In this embodiment, adjustable internal baffles 86 are provided for selectively diverting a portion of the circulated air flow for circulation about food products in holding area 76, without passage of the diverted air flow through perforated plate 74. Adjustable baffles 86 are positioned in close association with the perforated plate 74, and as best illustrated in FIG. 10, the baffles can be selectively adjusted by external adjustment screws 88 (FIG. 8) so that a selected portion of the air flow within housing 72 is diverted through bypass ducts 90. This diverted air flow circulates about the food products in holding area 76 concurrently with the circulation of heated air which passes through perforated plate 74.

As discussed, the circulation of heated air about fried food products positioned within product holding area 16 of the embodiment of FIGS. 1–7, or in product holding area 76 of the embodiment illustrated in FIG. 8–10, acts to evaporate moisture which migrates from the interior of the products to their surfaces, thereby maintaining the desired crispness of the products and significantly enhancing their sensory appeal. Testing during the development of the present invention has indicated that selected temperatures for the heated circulating air, and selected flow velocities of the air as it passes through the foraminous surface which provides the primary product holding area, provide significantly enhanced product quality when compared with similarly fried food which is placed under radiant heat lamps. For example, fried potato products have been found to retain their sensory appeal for a much longer period of time when they are subjected to a nominal air flow velocity in the range of approximately 260 to 300 feet per minute, as measured through the perforations in the foraminous surface beneath the product holding area. This air flow velocity is nominal in the sense that the exact air flow velocity varies somewhat across the foraminous surface beneath the product holding area, with this range being measured at a generally central portion of the foraminous surface.

As will be appreciated, the air circulating blower of the apparatus can be appropriately sized relative to the flow area of the air passages or perforations at the foraminous surface to provide air flow velocity in this preferred range. The preferred provision of adjustable air intake means, such as louvers 28 illustrated in the embodiment of FIGS. 1-7, accomodates convenient adjustment of the air flow velocity into the product holding area.

Tests on fried potato products have further indicated that the temperature of the heated air circulated about the products is preferably in the range of approximately 150 to 180 degrees Fahrenheit. The heating arrangement of the apparatus can be appropriately selected to provide air flow temperatures in this range, with the provision of suitable thermostatic controls facilitating maintainence of the air temperature in the desired range. Other temperatures for other products may be used. For example for breaded chicken chunk-type products, temperatures of from about 175 to 200 degrees Fahrenheit may be most desirable.

The results of testing on fried potato products has satisfactorily indicated that the products provide greater sensory appeal than similarly prepared products held under radiant heat lamps. Sensory testing has shown that the crispness of the product is better retained.

As will be appreciated, the exact air flow velocity and temperature employed in practicing the present invention can be readily varied from the above preferred ranges. For example, it may be desired to increase the temperature of the air for certain types of food products, such as batter-fried chicken nuggets. The above temperature and air velocity ranges have been found to be particularly effective with fried potato products such as French fry strips, but it will be appreciated that the dimensions, configuration, composition, and rate of moisture migration of a particular food product must be considered in selecting air temperature and velocity for optimum results.

Thus, an apparatus and method are disclosed for maintaining the crispness of fried food products after they are fried, but prior to their consumption. The present invention represents a significant development, especially for the fast service restaurant industry, since the invention not only provides fried products of significantly enhanced sensory appeal, but also permits greater flexibility in preparation of the food products.

From the foregoing, it will be observed that numerous variations and modifications may be effected without departing from the true spirit and scope of the present invention. It will be understood that no limitation with respect to the specific apparatus illustrated herein is intended or should be inferred. It is, of course, intended to cover by the appended claims all such modifications that fall within the scope of the claims.

What is claimed is:

1. An apparatus for holding and maintaining the crispness of freshly fried food products, comprising;
    an upright, closed housing having an upwardly facing foraminous serving surface exposed to the surrounding atmosphere which provides an open product holding means adjacent the upper portion of the housing and adapted to receive food products such that said food products are exposed to the atmosphere, and from which the food products are to be served to customers;
    air circulation means associated with said housing for forcibly circulating air through said housing and outwardly of the housing through said foraminous surface and about and through the food products which are exposed to the atmosphere in said product holding means; and
    heater means associated with said air circulation means for selectively heating the circulating air so that said heated air is forcibly circulated about and through the food products in said product holding means, said air circulation means being disposed in said housing and with said heater means being disposed within said housing in full communication with said air circulation means.

2. An apparatus in accordance with claim 1, including adjustable baffle means positioned within said housing in association with said foraminous surface, said baffle means being adapted to divert a portion of the heated air flow within said housing for circulation about the food products without passage through said foraminous surface.

3. An apparatus in accordance with claim 1, and foraminous baffle means positioned within said housing upstream of said foraminous surface for enhancing the uniformity of air flow through said foraminous surface.

4. The apparatus in accordance with claim 1, including
    means for diverting a portion of the heated air flow within said housing for passage through another foraminous surface of said housing which provides a secondary product holding area.

5. The apparatus in accordance with claim 1, wherein said air circulation means receive air from air intake means positioned in close association with said product holding means so that at least some of the heated air circulated about said food products is recirculated through said air circulation means.

6. The apparatus in accordance with claim 1, wherein said air circulation means comprise a blower positioned within said housing, and
    said heater means comprise at least one heater element disposed within said housing downstream of said blower.

7. An apparatus in accordance with claim 6, including adjustable baffle means disposed within said housing downstream of said heater element for guiding the flow of circulated air through said foraminous surface.

8. An apparatus in accordance with claim 6, wherein said housing includes another upwardly facing foraminous surface providing a secondary product holding area, with internal baffle means positioned within said housing so that heated air flow from said heater element is ducted to pass through each of said foraminous surfaces.

9. An apparatus in accordance with claim 7, including air intake means for said blower positioned adjacent said product holding means so that at least some of the heated air circulated about the food products in the product holding means is recirculated through said blower.

10. An apparatus for maintaining the crispness of fried food products, comprising:
    an upright closed housing defining product holding means comprising an upwardly open, bin-like product holding area adapted to receive the fried food products, said housing including perforated plate means adjacent the upper portion of the housing defining the bottom of the holding area, said plate means being exposed to the surrounding atmosphere and acting as a service plate;

an air circulating means comprising an air circulating blower positioned within said housing for forcibly circulating air through said perforated plate means and for forcibly circulating air about and through the food products in said product holding area wherein said food products are exposed to the atmosphere; and heater means disposed within said housing downstream of said blower for heating the circulating air prior to passage through said perforated plate means for forced circulation about and through said exposed food products.

11. An apparatus in accordance with claim 10, wherein
said heater means are adapted to heat the air circulated about said food products to a temperature in the range of approximately 150 to 180 degrees Fahrenheit.

12. An apparatus in accordance with claim 10, including
adjustable air intake means for said air circulating blower for selectively varying the velocity of the air flow through said perforated plate means.

13. An apparatus in accordance with claim 10, wherein
said housing includes another perforated plate means which is upwardly facing and defines a packaged product holding area adapted to receive food products from said bin-like product holding area after they are packaged, and internal baffle means disposed within said housing for ducting heated air flow from said heater means through both said perforated plate means to both said holding areas.

14. An apparatus in accordance with claim 13, wherein
said housing defines air intake means for said blower positioned in close association with said bin-like holding area for recirculating heated air therefrom through said blower.

15. An apparatus in accordance with claim 13, and
adjustable internal baffle means positioned within said housing downstream of said heater means for selectively adjustable guidance of the heated air flow into said bin-like holding area.

* * * * *